US006953193B2

(12) United States Patent
Kanzaki

(10) Patent No.: US 6,953,193 B2
(45) Date of Patent: Oct. 11, 2005

(54) SEALING APPARATUS

(75) Inventor: Go Kanzaki, Fukushima (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/631,737

(22) Filed: Aug. 1, 2003

(65) Prior Publication Data

US 2005/0023766 A1 Feb. 3, 2005

(51) Int. Cl.[7] .................................................. F16J 15/32

(52) U.S. Cl. ........................ 277/562; 277/549; 277/560; 277/565

(58) Field of Search ................................. 277/549, 562, 277/560, 565

(56) References Cited

U.S. PATENT DOCUMENTS 5,887,875 A * 3/1999 Salciccioli et al. ......... 277/402
5,947,611 A * 9/1999 Nagase ....................... 384/448
5,975,534 A * 11/1999 Tajima et al. ............... 277/353
6,059,663 A * 5/2000 Jones et al. ................. 464/133
6,206,380 B1 * 3/2001 Miyazaki .................... 277/551
6,688,605 B1 * 2/2004 Yano et al. ................. 277/566

FOREIGN PATENT DOCUMENTS

JP 09-287619 11/1997

* cited by examiner

*Primary Examiner*—Enoch Peavey
(74) *Attorney, Agent, or Firm*—Jacobson Holman PLLC

(57) ABSTRACT

To reduce a sliding resistance to the rotation member, and whereby to reduce a torque, a thickness of an inner diameter side lip is formed to be larger than a thickness of an outer diameter side lip, and the outer diameter side lip is formed thinner than the inner diameter side lip in thickness. A depression for inhibiting both the lips from pulling at each other is provided between the inner diameter side lip and the grease lip. A bent portion for reducing a close contact load applied to a rotation member is provided in an intermediate portion in a longitudinal direction of the inner diameter side lip.

3 Claims, 5 Drawing Sheets

$t_1 < t_2$ $t_1 < t_2$ $t_1 < t_2$ $t_1 < t_2$ $t_1 > t_2$

SEALING APPARATUS

BACKGROUND OF THE INVENTION

1. Field of the Invention

The present invention relates to a sealing apparatus, and more particularly to a sealing apparatus having a plurality of seal lips.

2. Description of the Conventional Art

In conventional, as this kind of sealing apparatus, there has been known, for example, a sealing apparatus 52 which is used in a bearing portion 51 of a wheel suspension apparatus for a motor vehicle shown in FIG. 4. As shown enlargedly in FIG. 5, the sealing apparatus 52 is structured as follows.

First, a mounting ring 54 made of a rigid material such as a metal is provided so as to be fixedly attached to an inner periphery of an outer ring 53 in the bearing portion 51, and an elastic body 55 made of a rubber elastic material is vulcanized and bonded to the mounting ring 54. A plurality of seal lips are integrally formed in the elastic body 55. A plurality of the seal lips are constituted by an outer diameter side lip 58 which is slidably in close contact with an end surface of a flange portion 57 provided in a hub 56 corresponding to a rotation member in the bearing portion 51, an inner diameter side lip 59 which is slidably in close contact with the end surface of the flange portion 57 in an inner peripheral side thereof, and a grease lip 60 which is slidably in close contact with an outer peripheral surface of the hub 56.

In three seal lips mentioned above, the outer diameter side lip 58 and the inner diameter side lip 59 are structured such as to seal a bearing to prevent foreign materials such as muddy water, dust or the like in the outside from entering into the inside of the bearing, have an outward structure in accordance with the function thereof, and are formed such that a diameter is gradually enlarged from the base end toward the leading end. Further, the grease lip 60 is structured such as to seal the bearing to prevent a lubricating grease inside the bearing from leaking to the outside, has an inward structure in accordance with the function thereof, and is formed such that a diameter is gradually reduced from the base end toward the leading end.

The conventional sealing apparatus 52 is provided with two lips comprising the outer diameter side lip 58 and the inner diameter side lip 59 toward the outside. Accordingly, the conventional sealing apparatus 52 is structured such as to bring out an excellent muddy water resistance, however, the conventional sealing apparatus 52 has the following disadvantage.

Comparing the outer diameter side lip 58 with the inner diameter side lip 59, the former outer diameter side lip 58 is larger in its diameter, and thus an increase of rotation torque of the hub 56 is greatly affected. In spite of such the fact, a thickness t1 of the outer diameter side lip 58 is formed to be larger than a thickness t2 of the inner diameter side lip 59 (t1>t2) so as to prevent permanent deformation by fatigue of the outer diameter side lip 58 bringing out a primary sealing effect against the muddy water in the outside, in the prior art mentioned above. Therefore, as the total of two lips 58 and 59, there is a disadvantage that a sliding resistance to the rotation member such as the hub is comparatively large, whereby a torque is comparatively high.

SUMMARY OF THE INVENTION

The present invention is made by taking the points mentioned above into consideration, and an object of the present invention is to provide a sealing apparatus having a plurality of seal lips which are slidably in close contact with a rotation member provided with a flange portion, in which sliding resistance to the rotation member can be reduced, whereby it is possible to reduce a rotation torque of the rotation member.

In order to achieve the object mentioned above, in accordance with a first aspect of the present invention, there is provided a sealing apparatus having a plurality of seal lips which are slidably in close contact with a rotation member provided with a flange portion, comprising an outer diameter side lip and an inner diameter side lip which are slidably in close contact with an end surface of the flange portion, wherein the outer diameter side lip has a shape which is thinner than the inner diameter side lip with respect to a thickness of the lip.

Further, in accordance with a second aspect of the present invention, there is provided a sealing apparatus as recited in the first aspect mentioned above, wherein a grease lip is provided adjacently to the inner diameter side lip, and a depression for inhibiting both the lips from pulling each other is provided between the inner diameter side lip and the grease lip.

Further, in accordance with a third aspect of the present invention, there is provided a sealing apparatus as recited in the first aspect mentioned above, wherein a bent portion for reducing a close contact load applied to the rotation member is provided in an intermediate portion in a longitudinal direction of the inner diameter side lip.

A point of view of the present invention provided with the structure mentioned above is as follows.

As described above, since the outer diameter side lip greatly affects to an increase of torque in comparison with the inner diameter side lip (a drag against the rotation of an axis is greater in the outer diameter side lip in proportion to a moment of the drag), a reduction of torque is achieved by making the outer diameter side lip in a shape thinner than the conventional shape and making the inner diameter side lip thicker than the conventional shape, that is, making the inner diameter side lip thicker than the outer diameter side lip and making the outer diameter side lip thinner than the inner diameter side lip in view of the thickness of the lips. In this case, if taking into consideration only the reduction of torque, the torque can be reduced by simply making both outer diameter side lip and the inner diameter side lip thinner than the conventional shape, however, in this case, it is impossible to sufficiently secure the muddy water resistance which is required in the sealing apparatus. Thus, in accordance with the present invention, the inner diameter side lip is made thicker than the conventional shape, and the outer diameter side lip is formed in a shape thinner than the inner diameter side lip with respect to the thickness of the lip. Therefore, as the total of two lips, the reduction of torque is achieved, and with respect to the muddy water resistance, the same or more performance as the conventional shape can be secured.

Further, when making the inner diameter side lip thick, an increase of torque of the inner diameter side lip may be a problem. Accordingly, it is preferable to form the lips in such a shape that the inner diameter side lip and the grease lip do not pull each other in a state in which the respective lips are in contact with the rotation member (in a shape that the lips themselves are independent from each other). On the basis of this view, in accordance with the second aspect, the depression for inhibiting both the lips from pulling each other is provided between the inner diameter side lip and the grease lip, thereby reducing interference between both the lips. Further, in accordance with the third aspect, the bent portion for reducing the close contact load applied to the rotation member is provided in the intermediate portion in the longitudinal direction of the inner diameter side lip (the inner diameter side lip is formed in the bent shape) thereby inhibiting the close contact load (a stress) from being increased.

The muddy water resistance is improved by making the inner diameter side lip thick for the following reasons.

The inner diameter side lip becomes thicker by making the outer diameter side lip thin for reducing the torque. Since the outer diameter side lip is made thin only in the thickness while a fastening margin of the outer diameter side lip is kept equal to the conventional one, it is considered that the outer diameter side lip is affected greatly by the permanent deformation by fatigue. Therefore, in the case of considering the muddy water resistance as the total of the outer diameter side lip and the inner diameter side lip, the influence of the deformation by fatigue is reduced by making the inner diameter side lip thick (while the side lip shape remains), so that the muddy water resistance is totally made equal to or more than the conventional one.

In this case, the present application includes the following technical matters.

That is, in order to achieve the object mentioned above, one sealing apparatus proposed by the present application is provided with the following contents.

(1) With respect to the thickness of the lip, the outer diameter side lip (the outer lip) is formed in a shape thinner than the inner diameter side lip (the inner lip), or the inner diameter side lip is formed in a shape thicker than the outer diameter side lip.

(2) The inner diameter side lip is formed in a shape to be independent from the grease lip by forming the depression.

(3) The inner diameter side lip is formed in a shape to be bent.

(4) The sealing apparatus of the present invention is used, for example, as a seal for a hub bearing in a field relevant to a motor vehicle, or is used in the other general purpose machines.

DESCRIPTION OF THE PREFERRED EMBODIMENTS

A description will be next given of embodiments in accordance with the present invention with reference to the accompanying drawings.

First Embodiment

Figure 1:
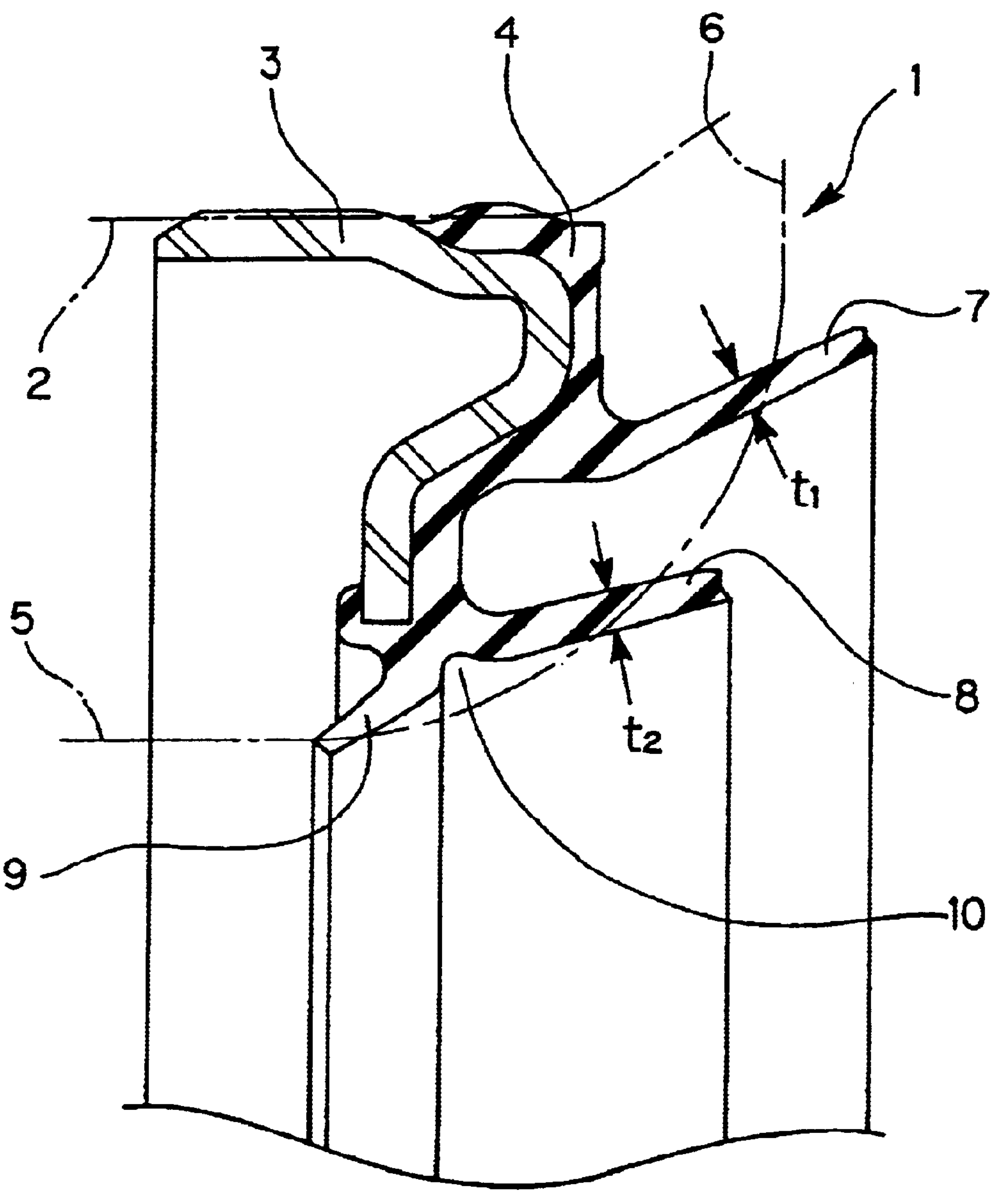
FIG. 1 is a cross sectional view of a main portion of a sealing apparatus in accordance with a first embodiment of the present invention.
Figure 4:
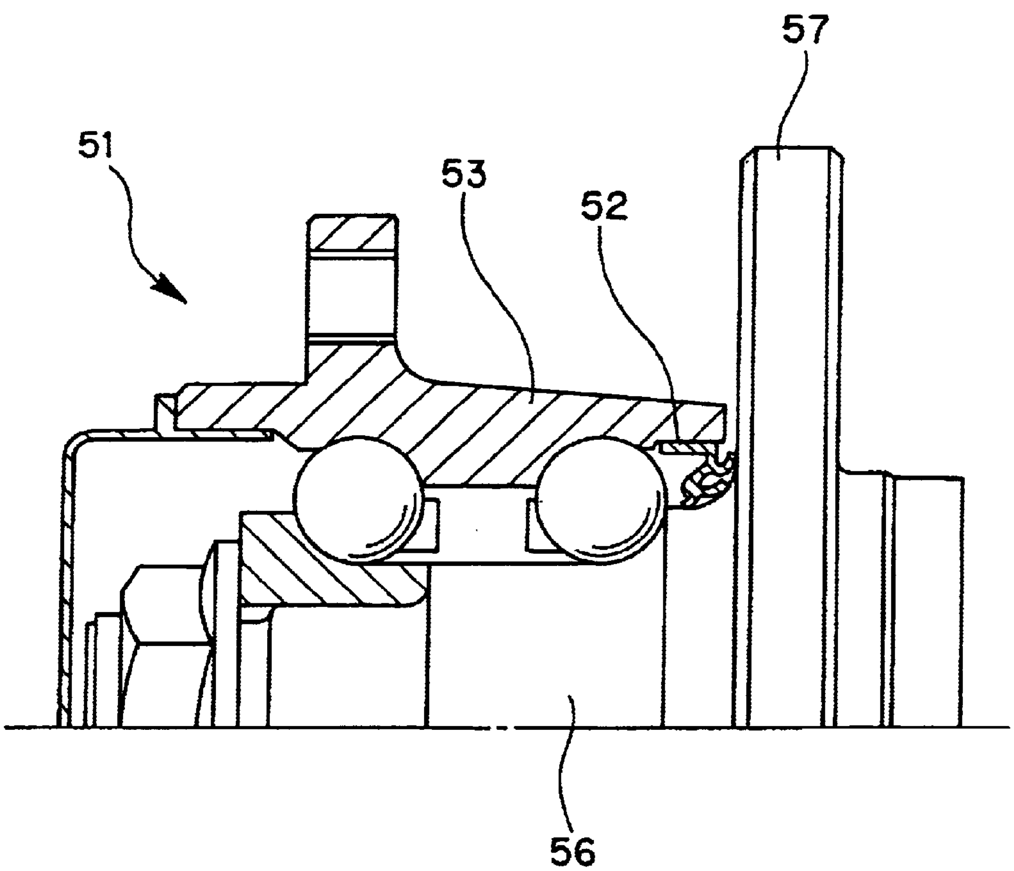
FIG. 4 is an explanatory view of a bearing portion of a wheel suspension apparatus.
Figure 5:
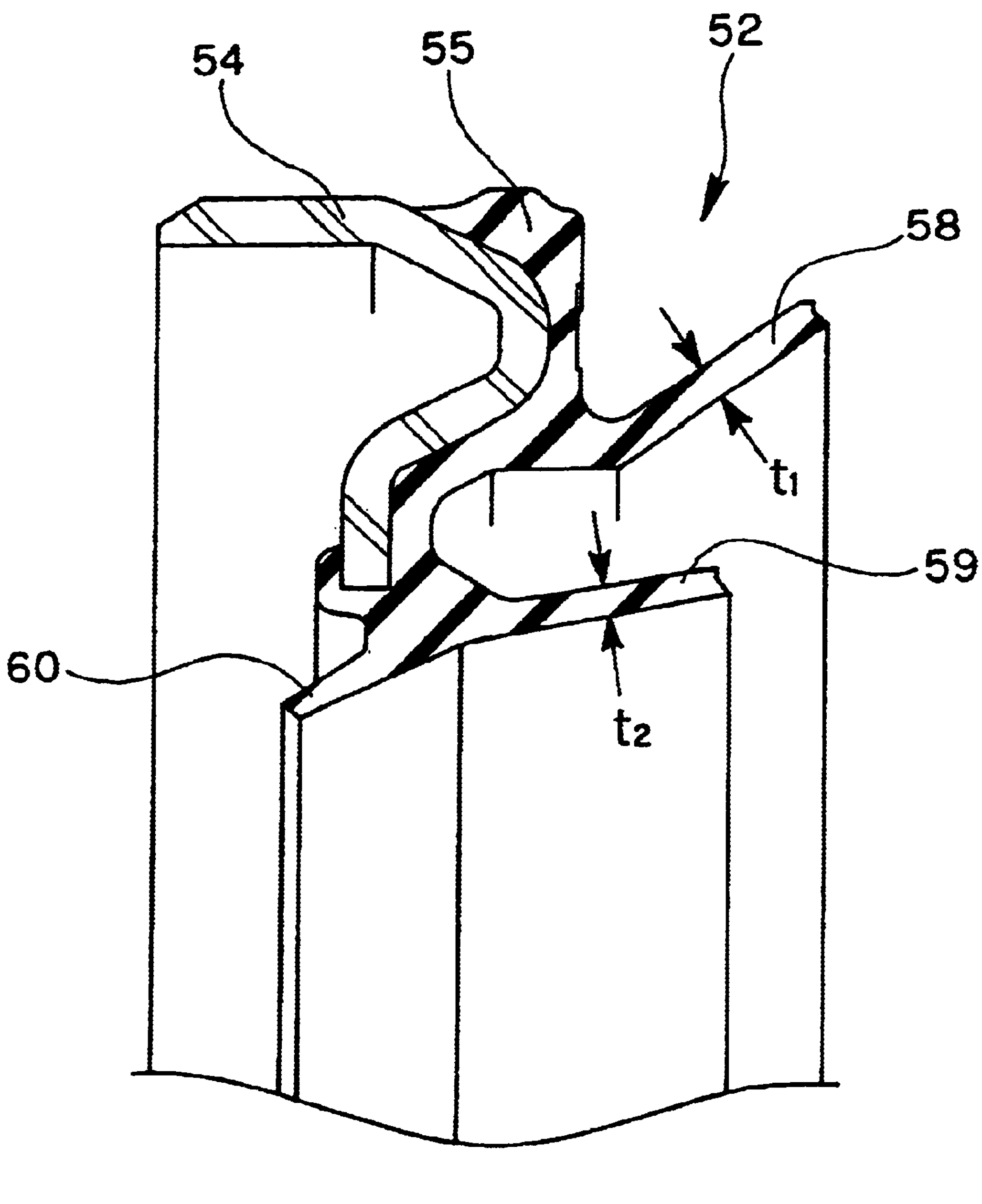
FIG. 5 is a cross sectional view of a main portion of a sealing apparatus in accordance with a conventional embodiment.

FIG. 1 shows a cross section of a main portion of a sealing apparatus 1 in accordance with a first embodiment of the present invention. The sealing apparatus 1 is used as a seal for a hub bearing in a bearing portion in a wheel suspension apparatus for a motor vehicle as shown in FIG. 4. The sealing apparatus 1 is structured as follows.

First, a mounting ring 3 made of a rigid material such as a metal is provided so as to be fixedly attached to an inner periphery of an outer ring 2 corresponding to a mounting member in the bearing portion mentioned above, and an elastic body 4 made of a rubber elastic material is vulcanized and bonded to the mounting ring 3. A plurality of seal lips are integrally formed in the elastic body 4. A plurality of the seal lips are constituted by an outer diameter side lip (also simply referred to as a side lip) 7 which is slidably in close contact with an end surface of a flange portion 6 provided in a hub 5 corresponding to a rotation member in the bearing portion (including a curved surface portion having a circular arc cross sectional shape between an axially vertical end surface of the flange portion 6 and an outer peripheral cylindrical surface of the hub 5, hereinafter same as above), an inner diameter side lip (also referred to as an intermediate lip) 8 which is slidably in close contact with the end surface of the flange portion 6 in an inner peripheral side thereof, and a grease lip 9 which is slidably in close contact with an outer peripheral surface of the hub 5.

In three seal lips mentioned above, each of the outer diameter side lip 7 and the inner diameter side lip 8 is structured such as to seal a bearing to prevent foreign materials such as muddy water, dust or the like in the outside from entering into the inside of the bearing, has an outward structure in accordance with the function thereof, and is formed such that a diameter is gradually enlarged from the base end toward the leading end. Further, a thickness t2 of the latter inner diameter side lip 8 is formed to be larger than a thickness t1 of the former outer diameter side lip 7, and the outer diameter side lip 7 is formed in a shape thinner than the inner diameter side lip 8 with respect to the thickness of the lip ($t1<t2$).

Further, the grease lip 9 is structured such as to seal the bearing to prevent a lubricating grease inside the bearing from leaking to the outside, has an inward structure in accordance with the function thereof, and is formed such that a diameter is gradually reduced from the base end thereof toward the leading end.

Further, an annular depression 10 for inhibiting both the lips 8 and 9 from pulling each other at a time of being attached is provided between the inner diameter side lip 8 and the grease lip 9 provided adjacently to the inner diameter side lip 8 so as to be positioned between base ends thereof.

In accordance with the sealing apparatus 1 having the structure mentioned above, since the thickness t2 of the inner diameter side lip 8 is formed to be larger than the thickness of the outer diameter side lip 7, and the outer diameter side lip 7 is formed in a shape thinner than the inner diameter side lip 8 in view of the thickness of the lip, it is possible to reduce the torque in accordance with the matter mentioned above, and it is also possible to secure the muddy water resistance. Further, since the annular depression 10 is provided between the inner diameter side lip 8 and the grease lip 9, it is possible to inhibit the lips 8 and 9 from pulling each other under the state of being attached, whereby it is possible to inhibit the torque from being increased in the inner diameter side lip 8.

Second Embodiment

Figure 2:
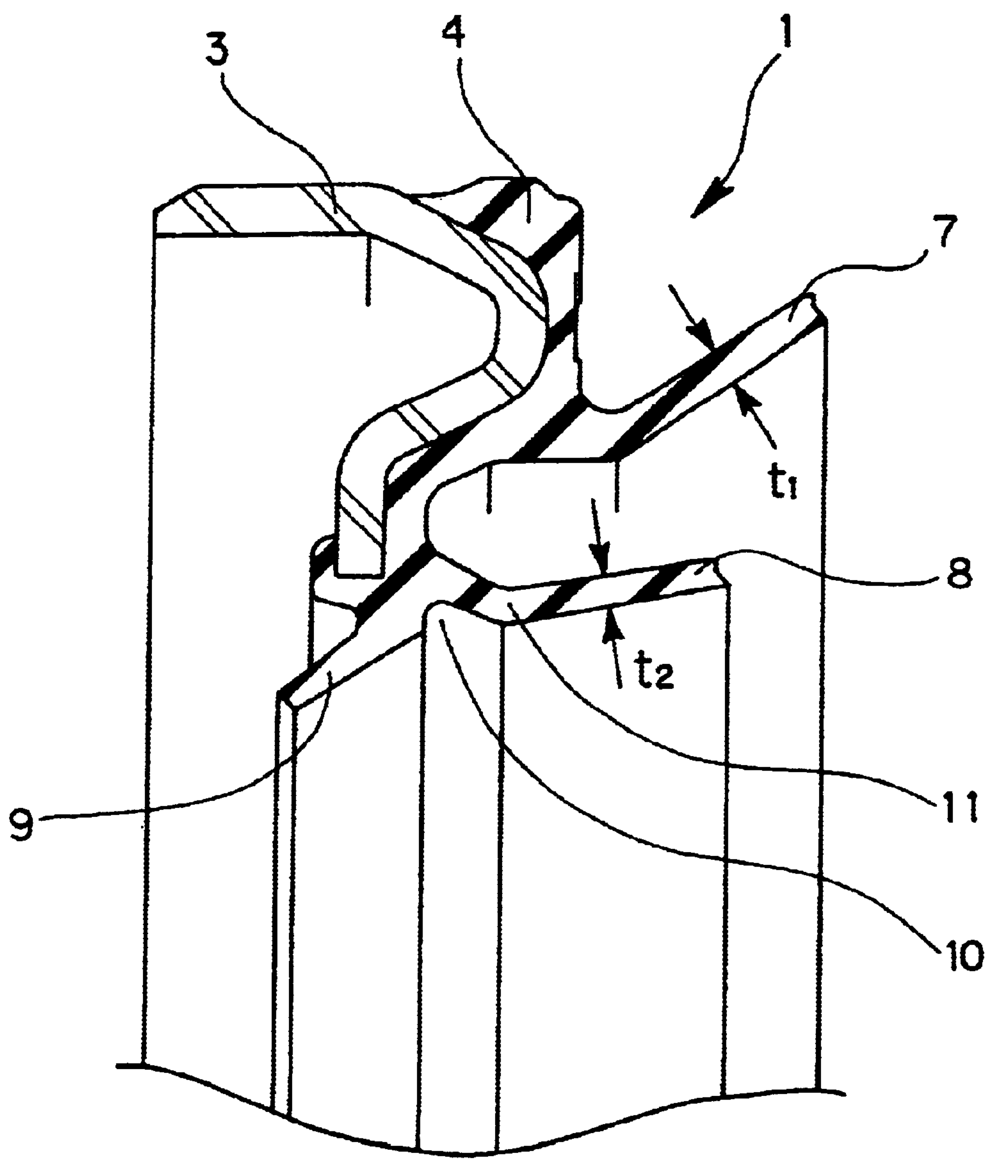
FIG. 2 is a cross sectional view of a main portion of a sealing apparatus in accordance with a second embodiment of the present invention.

FIG. 2 shows a cross section of a main portion of a sealing apparatus 1 in accordance with a second embodiment of the present invention. The sealing apparatus 1 is used as a seal for a hub bearing in a bearing portion in a wheel suspension apparatus for a motor vehicle as shown in FIG. 4. The sealing apparatus 1 is structured as follows.

First, a mounting ring 3 made of a rigid material such as a metal is provided so as to be fixedly attached to an inner periphery of an outer ring 2 corresponding to a mounting member in the bearing portion mentioned above, and an elastic body 4 made of a rubber elastic material is vulcanized and bonded to the mounting ring 3. A plurality of seal lips are integrally formed in the elastic body 4. A plurality of the seal lips are constituted by an outer diameter side lip (also simply referred to as a side lip) 7 which is slidably in close contact with an end surface of a flange portion 6 provided in a hub 5 corresponding to a rotation member in the bearing portion (including a curved surface portion having a circular arc cross sectional shape between an axially vertical end surface of the flange portion 6 and an outer peripheral cylindrical surface of the hub 5, hereinafter same as above), an inner diameter side lip (also referred to as an intermediate lip) 8 which is slidably in close contact with the end surface of the flange portion 6 in an inner peripheral side thereof, and a grease lip 9 which is slidably in close contact with an outer peripheral surface of the hub 5.

In three seal lips mentioned above, the outer diameter side lip 7 is structured such as to seal a bearing to prevent foreign materials such as muddy water, dust or the like in the outside from entering into the inside of the bearing, has an outward structure in accordance with the function thereof, and is formed such that a diameter is gradually enlarged from the base end toward the leading end.

Further, the inner diameter side lip 8 is structured in the same manner such as to seal the bearing to prevent the foreign material such as the muddy water, the dust or the like in the outside from entering into the inside of the bearing, has an outward structure on the basis of the function thereof, and is formed in the leading end portion so that the diameter is gradually enlarged. Further, an annular bent portion 11 for reducing a close contact load applied to the hub 5 is provided in an intermediate portion in a longitudinal direction of the inner diameter side lip 8. The lip 8 is formed so that the diameter is gradually reduced from the base end toward the bent portion 11 and the diameter is gradually enlarged from the bent portion 11 to the leading end, in accordance with the provision of the bent portion 11.

Further, a thickness of the latter inner diameter side lip 8 is formed larger than a thickness of the outer diameter side lip 7, and the outer diameter side lip 7 is formed in a shape thinner than the inner diameter side lip 8 with respect to the thickness of the lip ($t1<t2$).

Further, the grease lip 9 is structured such as to seal the bearing to prevent a lubricating grease inside the bearing from leaking to the outside, has an inward structure in accordance with the function thereof, and is formed such that the diameter is gradually reduced from the base end thereof toward the leading end.

Further, an annular depression 10 for inhibiting both the lips 8 and 9 from pulling each other at a time of being attached is provided between the inner diameter side lip 8 and the grease lip 9 provided adjacently to the inner diameter side lip 8 so as to be positioned between the base ends thereof.

In accordance with the sealing apparatus 1 having the structure mentioned above, since the thickness t2 of the inner diameter side lip 8 is formed to be larger than the thickness of the outer diameter side lip 7, and the outer diameter side lip 7 is formed in a shape thinner than the inner diameter side lip 8 in view of the thickness of the lip, it is possible to reduce the torque in accordance with the matter mentioned above, and it is also possible to secure the muddy water resistance. Further, since the annular depression 10 is provided between the inner diameter side lip 8 and the grease lip 9, it is possible to inhibit the lips 8 and 9 from pulling each other under the state of being attached, whereby it is possible to inhibit the torque from being increased in the inner diameter side lip 8. Further, since the annular bent portion 11 is provided in the intermediate portion in the longitudinal direction of the inner diameter side lip 8, it is possible to reduce the close contact load applied to the flange portion 6, and it is possible to inhibit a stress from being increased.

In this case, the sealing apparatus 1 in accordance with the first or second embodiment mentioned above may be modified or changed as follows.

Figure 3:
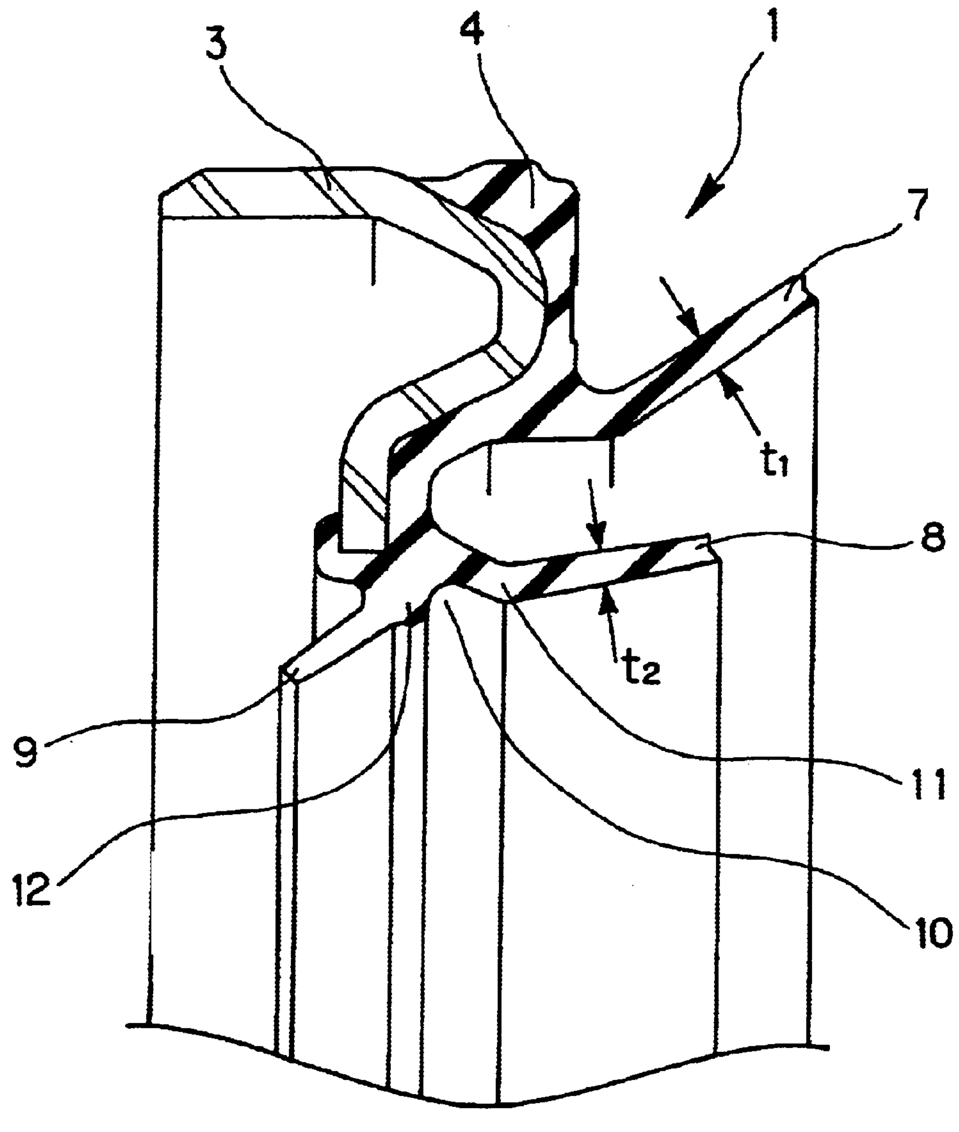
FIG. 3 is a cross sectional view of a main portion of a sealing apparatus in accordance with the other embodiment of the present invention.

(1) As shown in FIG. 3, an annular projection 12 is integrally formed in an inner periphery of the base end portion of the grease lip 9.

(2) In the second embodiment mentioned above, the bent portion 11 is provided in the inner diameter side lip 8, whereby the lip 8 is formed such that the diameter 8 is gradually reduced from the base end toward the bent portion 11, and the diameter is gradually enlarged from the bent portion 11 toward the leading end. However, in place thereof, the lip 8 is formed as follows.

Plan A) The lip 8 is formed such that the diameter is constant from the base end toward the bent portion 11, and the diameter is gradually enlarged from the bent portion 11 toward the leading end.

Plan B) The lip 8 is formed such that the diameter is gradually enlarged from the base end toward the bent portion 11, the diameter is also gradually enlarged from the bent portion 11 toward the leading end, and a rate of enlargement of the latter is set to be larger than a rate of enlargement of the former.

(3) Each of the lips may be formed such as to become gradually thinner from the base end toward the leading end. In this case, the thickness is compared in a center portion in the longitudinal direction (a portion in which a distance from the base end is equal to a distance from the leading end).

The present invention achieves the following effects.

That is, in the sealing apparatus in accordance with the first aspect of the present invention provided with the structure mentioned above, the thickness of the inner diameter side lip is set to be larger than the thickness of the outer diameter side lip, and the outer diameter side lip is formed in a shape thinner than the inner diameter side lip with respect to the thickness of the lip, in the sealing apparatus having a plurality of seal lips which are slidably in close contact with the rotation member provided with the flange portion. Accordingly, it is possible to reduce the torque, and it is possible to secure the muddy water resistance.

Further, in the sealing apparatus in accordance with the second aspect of the present invention provided with the structure mentioned above, the depression for inhibiting both the lips from pulling each other is provided between the inner diameter side lip and the grease lip. Accordingly, it is possible to inhibit the lips from pulling each other at a time of being attached, whereby it is possible to inhibit the increase of torque in the inner diameter side lip.

Further, in the sealing apparatus in accordance with the third aspect of the present invention provided with the structure mentioned above, the bent portion for reducing the close contact load applied to the rotation member is provided in the intermediate portion in the longitudinal direction of the inner diameter side lip. Accordingly, it is possible to reduce the close contact load applied to the rotation member, and it is possible to inhibit the stress from being increased.

What is claimed is:

1. A sealing apparatus having a plurality of seal lips for close sliding contact with a rotation member, the rotation member being provided with a flange portion, said sealing apparatus comprising:

an outer diameter side lip having a constant thickness across a free end located in contact with the flange portion and an inner diameter side lip having a constant thickness across a free end located in contact with the flange portion, said outer diameter side lip and said inner diameter side lip both being slidably in close contact with an end surface on one side of said flange portion at an angle to an axis of the rotation member, wherein the outer diameter side lip having said constant thickness thinner than said constant thickness of the inner diameter side lip at an approximate same portion of said outer diameter side lip and said inner diameter side lip relative to each other.

2. The sealing apparatus as claimed in claim 1, wherein a grease lip is provided adjacent to the inner diameter side lip, and an annular depression for inhibiting both the grease lip and the inner diameter side lip from pulling each other is provided between said inner diameter side lip and the grease lip.

3. The sealing apparatus as claimed in claim 1, wherein a bent portion for reducing a close contact load applied to the rotation member is provided in an intermediate portion in a longitudinal direction of the inner diameter side lip.

* * * * *